US012688210B2

(12) United States Patent
Erickson

(10) Patent No.: US 12,688,210 B2
(45) Date of Patent: Jul. 21, 2026

(54) PRIVATE ARTIFICIAL INTELLIGENCE (AI) SEARCHING ON A DATABASE USING A LARGE LANGUAGE MODEL

(71) Applicant: Elasticsearch B.V., Amsterdam (NL)

(72) Inventor: David Erickson, Washington, DC (US)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 18/667,424

(22) Filed: May 17, 2024

(65) Prior Publication Data

US 2024/0386041 A1 Nov. 21, 2024

Related U.S. Application Data

(60) Provisional application No. 63/503,031, filed on May 18, 2023.

(51) Int. Cl.
   *G06F 16/00* (2019.01)
   *G06F 16/3329* (2025.01)
(52) U.S. Cl.
   CPC .............................. *G06F 16/3329* (2019.01)
(58) Field of Classification Search
   CPC .................................................. G06F 16/3329
   USPC ........................................................ 707/705
   See application file for complete search history.

(56) References Cited

U.S. PATENT DOCUMENTS

| | | | | |
|---|---|---|---|---|
| 11,950,851 | B1 * | 4/2024 | Roh ........................ | A61B 34/20 |
| 11,960,514 | B1 * | 4/2024 | Taylert ................ | G06F 16/3329 |
| 12,111,859 | B2 * | 10/2024 | Siebel ...................... | G06F 40/40 |
| 2016/0359823 | A1 * | 12/2016 | Ayyadevara .......... | H04L 63/061 |
| 2020/0395004 | A1 * | 12/2020 | Yamasaki ............. | G10L 15/063 |
| 2022/0051479 | A1 * | 2/2022 | Agarwal ............... | G06N 3/045 |
| 2022/0236899 | A1 * | 7/2022 | Toyonaga ................ | G06N 3/08 |
| 2022/0245267 | A1 * | 8/2022 | Vangala ............. | G06F 16/9024 |
| 2023/0244966 | A1 * | 8/2023 | Sharma .................. | G06N 5/043 |
| | | | | 706/12 |
| 2023/0376852 | A1 * | 11/2023 | Wiggins ................. | G06N 3/105 |
| 2024/0160675 | A1 * | 5/2024 | Pham .................. | G06F 16/9532 |
| 2024/0232614 | A1 * | 7/2024 | Esmaeili ............... | G06N 3/044 |
| 2024/0356874 | A1 * | 10/2024 | Medalion ............... | G06F 40/20 |

OTHER PUBLICATIONS

International Search Report and Written Opinion for PCT Application No. PCT/US2024/029958, mailed on Aug. 13, 2024, 12 pages.
Arora, Simran, et al., "Can Foundation Models Help Us Achieve Perfect Sercrecy?", arXiv:2205.13722v2, Jan. 8, 2023, 22 pages.
Weng, Lilian, "Prompt Engineering: Lil'Log", https://lilianweng.github.io/posts/2023-03-15-prompt-engineering/, Mar. 15, 2023, 17 pages.

* cited by examiner

*Primary Examiner* — Monica M Pyo
(74) *Attorney, Agent, or Firm* — Brake Hughes Bellermann LLP

(57) ABSTRACT

A private artificial intelligence (AI) search platform enables generation of model responses using private data while maintaining data privacy within a private system boundary. The system receives a user query via a chat interface and retrieves a responsive private data portion from a vector database through a search. This retrieved context is injected into a prompt along with the user query and transmitted to a large language model (LLM). The LLM, which may be self-hosted on a server within the private system boundary, generates a model response based on the private data portion.

12 Claims, 5 Drawing Sheets

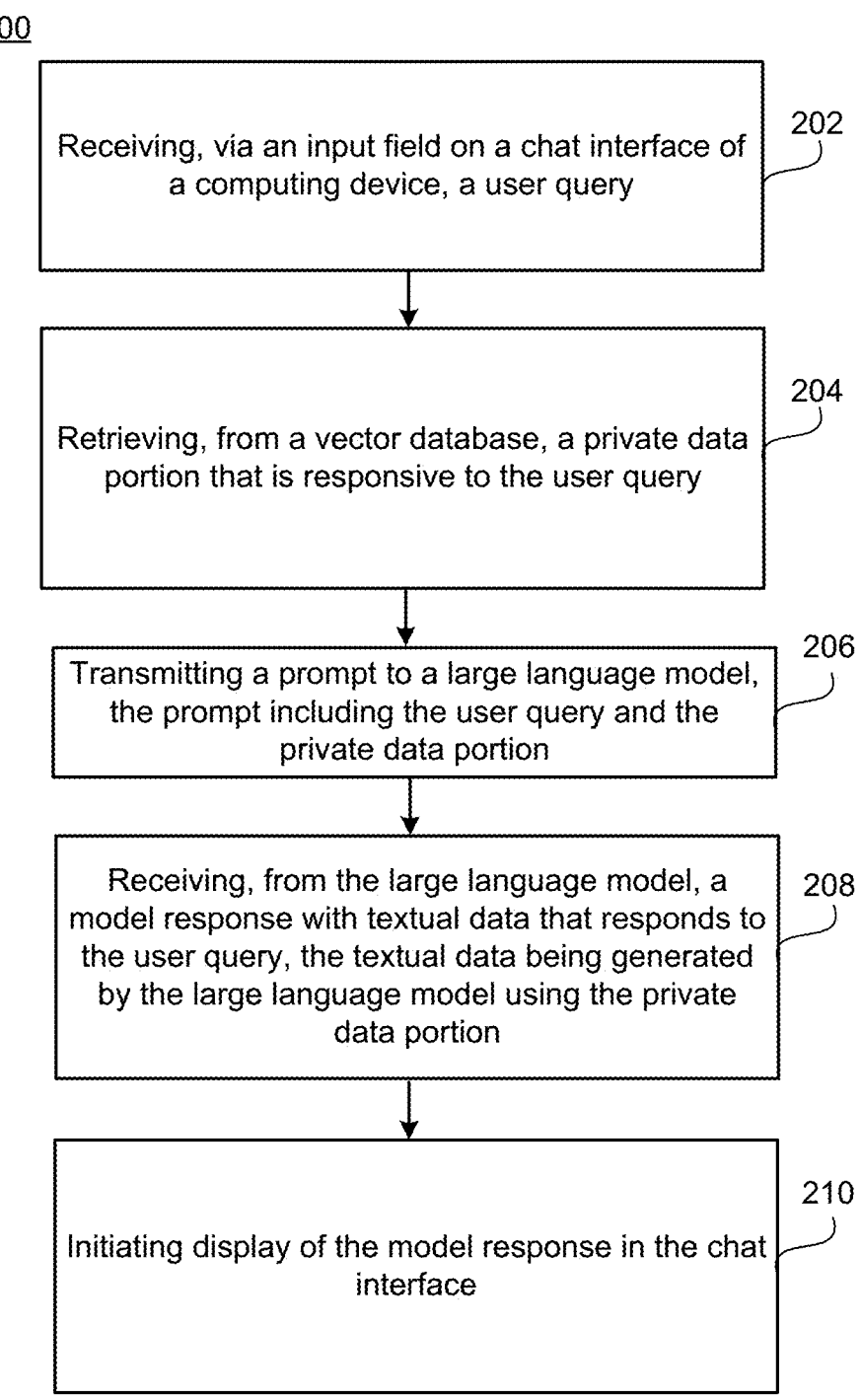

200

Receiving, via an input field on a chat interface of a computing device, a user query          202

Retrieving, from a vector database, a private data portion that is responsive to the user query          204

Transmitting a prompt to a large language model, the prompt including the user query and the private data portion          206

Receiving, from the large language model, a model response with textual data that responds to the user query, the textual data being generated by the large language model using the private data portion          208

Initiating display of the model response in the chat interface          210

FIG. 2

PRIVATE ARTIFICIAL INTELLIGENCE (AI) SEARCHING ON A DATABASE USING A LARGE LANGUAGE MODEL

CROSS-REFERENCE TO RELATED APPLICATION

This application claims priority to U.S. Provisional Application No. 63/503,031, filed on May 18, 2023, the disclosure of which is incorporated by reference herein in its entirety.

BACKGROUND

A predefined large language model (LLM) is typically configured (e.g., trained) using a large collection of publicly available information such as information found on the Internet. However, some private data may not be publicly available and/or used to configure (e.g., train) the LLM, and, therefore, the LLM may not be able to generate accurate responses from user queries about that private data. Re-training and/or fine-tuning an LLM with private data may be computationally expensive. Also, configuring an LLM to respond to user queries about private data may cause one or more security problems (e.g., a cybersecurity breach) associated with protecting private data.

SUMMARY

This disclosure relates to a system for enabling the generation of model responses using private data stored in a vector database in a manner that reduces the computational complexity of interfacing with a large language model (LLM), increases the speed of content generation using private data, and/or increases the security and privacy of a system that uses an LLM with private data. The system may enable artificial intelligence (AI) searching that protects the privacy of the underlying data. The system includes a private artificial intelligence (AI) search platform that enables an LLM to use data (e.g., private data) to generate a model response that responds to a user query in a manner that maintains the privacy of the data. The private AI search platform may execute a semantic search to retrieve private knowledge from a vector database and then inject that context in an LLM prompt that also includes the user query. The private AI search platform may enable retrieval augmented generation (RAG) using private data in a secure manner that can reduce the risk of cybersecurity breaches.

In some aspects, the techniques described herein relate to a method including: receiving, via an input field on a chat interface of a computing device, a user query; retrieving, from a vector database, a private data portion that is responsive to the user query; transmitting a prompt to a large language model, the prompt including the user query and the private data portion; receiving, from the large language model, a model response with textual data that responds to the user query, the textual data being generated by the large language model using the private data portion; and initiating display of the model response in the chat interface.

In some aspects, the techniques described herein relate to an apparatus including: at least one processor; and a non-transitory computer-readable medium storing executable instructions that cause the at least one processor to execute operations, the operations including: receiving, via an input field on a chat interface of a computing device, a user query; retrieving, from a vector database, a private data portion that is responsive to the user query; transmitting a prompt to a large language model, the prompt including the user query and the private data portion; receiving, from the large language model, a model response with textual data that responds to the user query, the textual data being generated by the large language model using the private data portion; and initiating display of the model response in the chat interface.

In some aspects, the techniques described herein relate to a non-transitory computer-readable medium storing executable instructions that when executed by at least one processor cause the at least one processor to execute operations, the operations including: receiving, via an input field on a chat interface of a computing device, a user query; retrieving, from a vector database, a private data portion that is responsive to the user query; transmitting a prompt to a large language model, the prompt including the user query and the private data portion; receiving, from the large language model, a model response with textual data that responds to the user query, the textual data being generated by the large language model using the private data portion; and initiating display of the model response in the chat interface.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart depicting example operations of a system for enabling the generation of model responses using private data stored in a vector database according to an aspect.

DETAILED DESCRIPTION

Figure 1A:
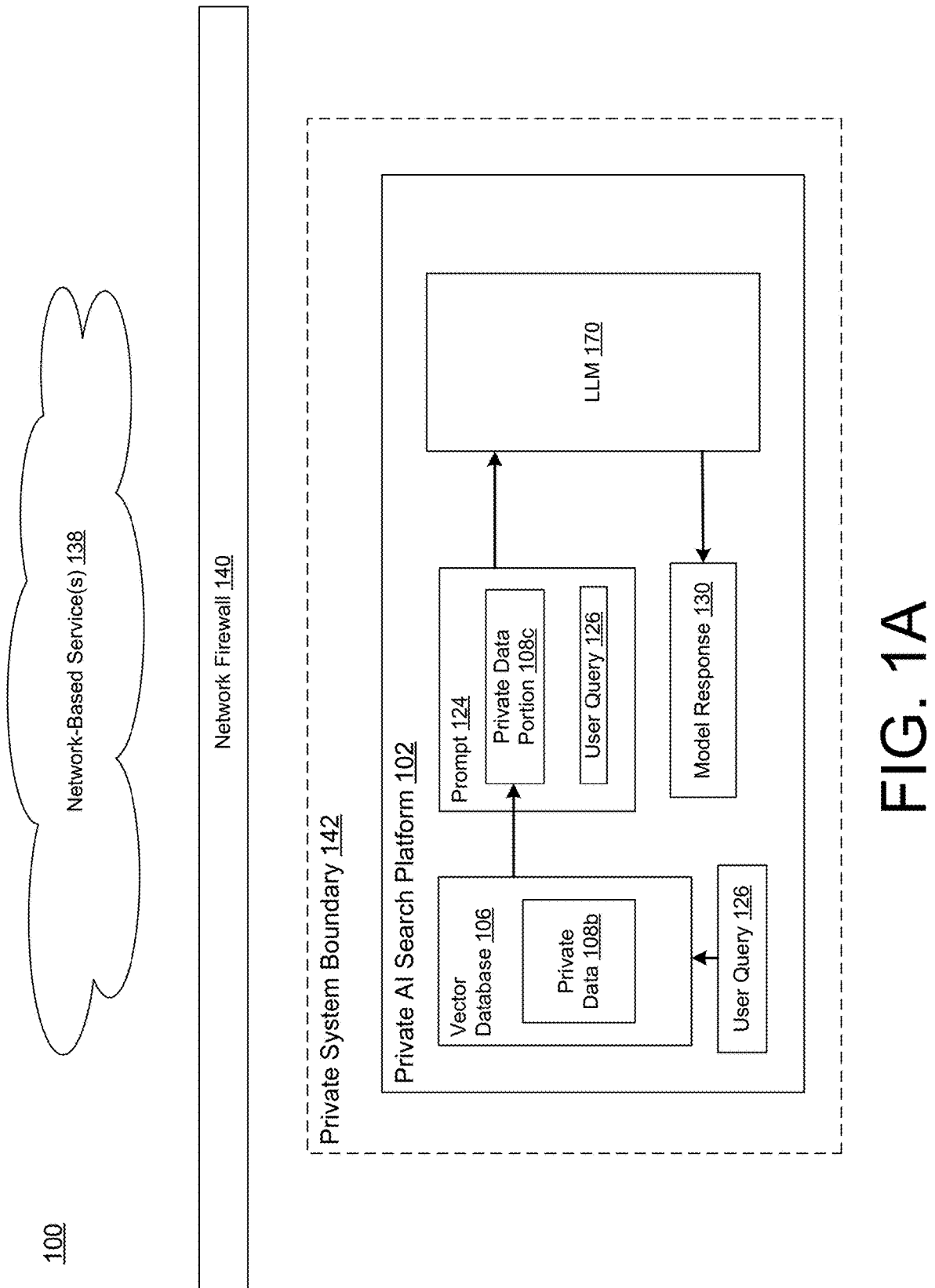
FIG. 1A illustrates a system for retrieval augmented generation using private data according to an aspect.
Figure 1B:
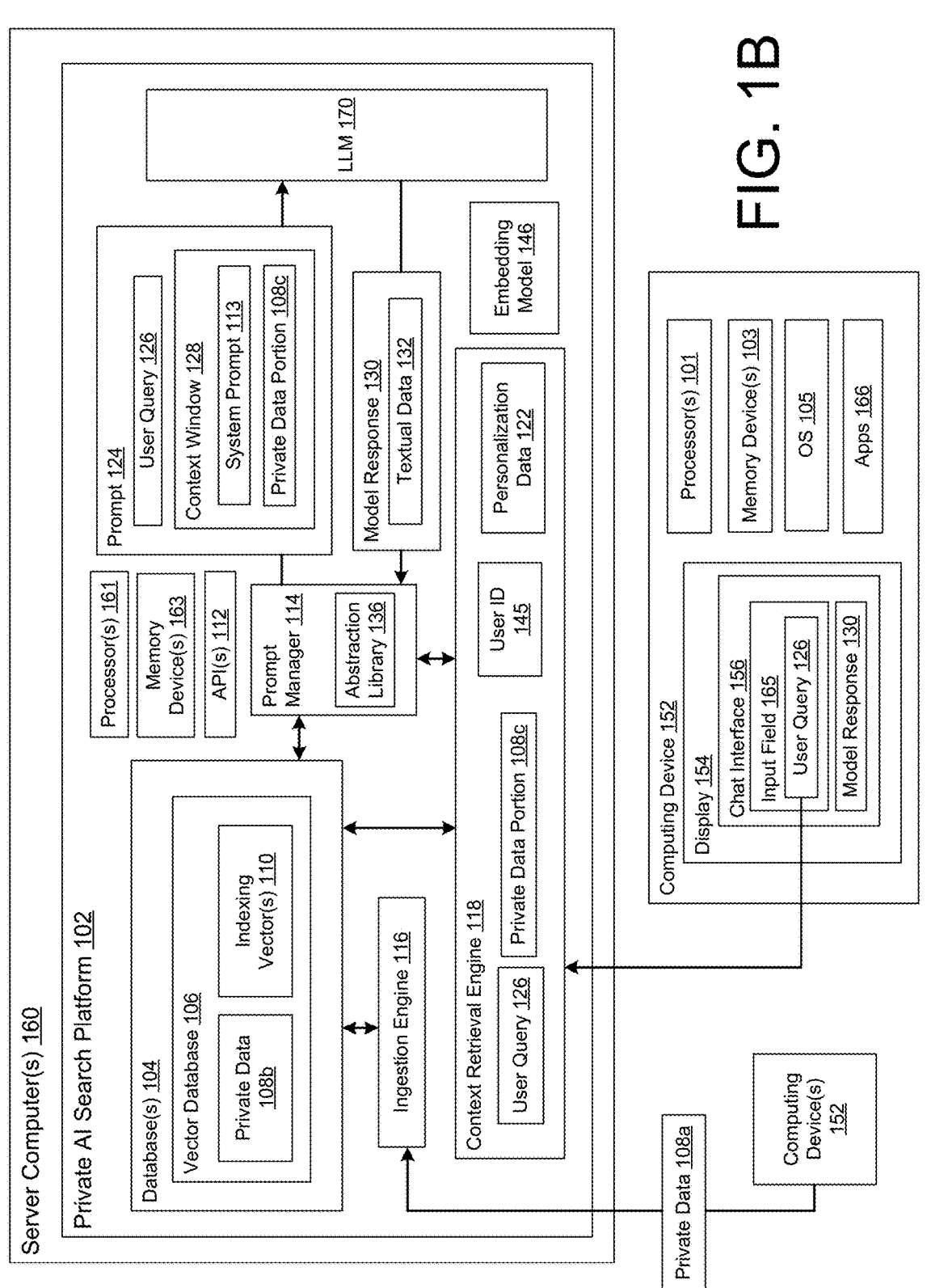
FIG. 1B illustrates a system for retrieval augmented generating using private data according to another aspect.

This disclosure relates to a system for enabling the generation of model responses using private data stored in a vector database in a manner that protects the privacy of the private data. The system includes a private artificial intelligence (AI) search platform that enables an LLM to use data (e.g., private data) to generate a model response that responds to a user query that maintains the privacy of the data. For example, the AI search platform may execute a semantic search to retrieve a private data portion (e.g., private knowledge) from a vector database and then inject that context in a prompt that also includes the user query. The private AI search platform includes a private LLM (e.g., a self-hosted LLM) configured to receive the prompt and generate a model response that responds to the user query based on the private data portion. The AI search platform may enable retrieval augmented generation (RAG) using private data in a secure manner that can reduce the risk of cybersecurity breaches.

The AI search platform may reduce amount of the computing resources (e.g., central processing unit (CPU) power, memory requirements, etc.) for generating such responses, increase the speed of generating LLM responses using private data, and/or provide a high level of security and privacy for protecting private data that is used by an LLM.

The LLM may be a self-hosted LLM. A self-hosted LLM may be an AI model for content generation (e.g., text, image, and/or video, etc.) that does not use a network-based service (e.g., a cloud service). In some examples, a self-hosted LLM is referred to as a private LLM. The LLM is a pre-configured LLM (e.g., a predefined LLM, a pre-trained LLM), and the LLM is stored on one or more server computers associated with an entity that owns or manages the AI search platform and/or the vector database. The system may define a private system boundary that includes the LLM, the vector database, and/or one or more other components of the private AI search platform (e.g., an ingestion engine, a context retrieval engine, a prompt manager, etc.). In some examples, instead of interfacing with a network-enabled LLM (e.g., a cloud-based LLM) stored on a remote server, the LLM is stored on server computer(s) within the private system boundary, which also includes the vector database and/or other components of the private AI search platform. The private AI search platform (or a portion thereof) within the private system boundary may be separated from one or more network-based services (e.g., any network-based service) via a network firewall that may control the transmission of data between the private AI search platform and the network-based service(s). The network-based services may include third party AI services such as public LLMs or AI tools and functionalities that can be accessed over the Internet.

A vector database is a database configured to store and retrieve information represented as vectors. A vector may be a series of numeric values or a multi-dimensional array that represent characteristics or features of a piece of data. Unlike traditional databases that store data in tables with rows and columns, a vector database stores data points as vectors (e.g., high-dimensional vectors). Each dimension may represent a specific feature or attribute of the data.

The private AI search platform includes an ingestion engine configured to receive data (e.g., private data) from one or more client devices and store the data in the vector database. In some examples, the ingestion engine may receive data (e.g., private data) from the client device(s), convert the data to a structured format (e.g., a vector format), and store the data in the structured format (e.g., the vector format). In other words, the ingestion engine may vectorize the incoming data, which includes converting textual data into numerical data (e.g., vectors) that represent the textual data. In some examples, the ingestion engine receives data in a vector format from the client device(s). In some examples, the ingestion engine uses an embedding model or a library configured to embed the textual data into vectors.

During data ingestion, the ingestion engine may be configured to execute parallel processing to vectorize the private data, which can decrease the time required to vectorize and store the data in the vector database. The ingestion engine may include a plurality of inference processors (e.g., machine-learning nodes, a set of distributed machine-learning nodes), where each inference processor is configured to convert a portion of the ingested data to structured data (e.g., a vector format) in parallel (e.g., at least partially in parallel) with other inference processors. In some examples, the ingestion engine may increase (e.g., scale up) or decrease (e.g., scale down) the number of inference processors, which may depend on the size of the private data to be stored in the vector database.

The private AI search platform includes a context retrieval engine configured to receive a user query via a chat interface (e.g., an AI chat interface) and retrieve a private data portion (e.g., one or more data segments), that is responsive to the user query, from the vector database. The private AI search platform includes a prompt manager configured to generate a prompt with the user query and a context window. The context window includes the private data portion retrieved by the context retrieval engine. In some examples, the context window includes one or more system prompts. A system prompt may be pre-configured textual data that directs the LLM to generate responses. The LLM uses the context window for formulating a model response with textual data that answers the search query from the private data portion included in the prompt.

In some examples, the vector database may function as a memory device (e.g., a long-term memory) and/or a semantic knowledge store when used in conjunction with an LLM. An example of the user query may be "how do I report unemployment benefits identity fraud in the District of Columbia." If this query is submitted to a conventional cloud based LLM, the response may be too generic or not accurate because the training data is older and/or the LLM was trained with publicly available training information that is misleading, deficient, or not available. A user can search the DC government's webpage using keywords, but the user would have to read through the various search results to try and find the right answer. However, if that DC government branch used the private AI search platform on their servers and stored their organization data (which may include internal docs about how to report unemployment benefits identity fraud) in the vector database, the private AI search platform may retrieve private knowledge from the vector database about the unemployment benefits identity fraud, and insert that private knowledge into a prompt that is used as context for generating an answer that responds to the user query may be "how do I report unemployment benefits identity fraud in the District of Columbia." Since the LLM is a self-hosted LLM on the servers within the private system boundary, the privacy and security of the private data is maintained.

In some examples, the context retrieval engine may retrieve personalization data about the user that submitted the user query from the vector database, and the prompt manager may include the personalization data in the prompt so that the LLM can personalize the model response. In some examples, the personalization data may include a location of the user, organization group(s) associated with the user, and/or an organization role of the user. For example, in response to the query "how does compensation work", the model response may depend on whether the user is a manager, a non-managing engineer, or other organization role or group associated with the user.

In some examples, the prompt manager may communicate with one or more LLMs. For example, instead of integrating a single LLM in the private AI search platform, the prompt manager may be configured to operate with a plurality of different LLMs, e.g., different self-hosted LLMs. The techniques discussed herein provide the user freedom to use a variety of different LLMs, as well as the ability to pivot between multiple LLMs at any point in time, which may provide improvements in cost control, speed, and/or privacy. These and other features are further described with reference to the figures.

FIGS. 1A through 1D illustrate a system 100 for enabling the generation of model responses 130 using private data stored in a database 104 (e.g., a vector database 106) in a manner that reduces the computational complexity of interfacing with a large language model (LLM) 170, increases the speed of content generation using private data, and/or increases the security and privacy of a system 100 that uses an LLM 170. The system 100 includes a private artificial intelligence (AI) search platform 102 that enables an LLM 170 to use private data to generate a model response 130 that responds to a user query 126 that maintains the privacy of the private data. For example, the private AI search platform 102 may execute a semantic search to retrieve private knowledge (e.g., private data portion 108*c*) from a vector database 106 and then inject that context in a prompt 124 that also includes the user query 126. The private AI search platform 102 includes an LLM 170 (e.g., a private LLM or a self-hosted LLM) configured to receive the prompt 124 and generate a model response 130 that responds to the user query 126 based on the private data portion 108*c*. The private AI search platform 102 may enable retrieval augmented generation (RAG) using private data 108*b* in a secure manner that can reduce the risk of cybersecurity breaches.

The LLM 170 may be a self-hosted LLM. A self-hosted LLM may be an AI model for content generation (e.g., text, image, and/or video, etc.) that does not use a network-based service (e.g., a cloud service). In some examples, a self-hosted LLM is referred to as a private LLM. The LLM 170 is a pre-configured LLM (e.g., a predefined LLM, a pre-trained LLM), and the LLM 170 is stored on one or more server computers 160 associated with an entity that owns or manages the private AI search platform 102 and/or the database 104 (e.g., the vector database 106).

The system may define a private system boundary 142 for one or more portions of the private AI search platform 102. The private system boundary 142 may include other system components (not shown), which are dependent upon the type and application of a computing system that uses the private AI search platform 102. A private system boundary 142 may be a logical and/or physical separation between a system that includes the private AI search platform 102 and its environment. The environment may include other systems, users, external connections, and/or network-based services 138. In some examples, a private system boundary 142 is a demarcation line, an interface, or a separation point that separates a system that includes the private AI search platform 102 from its environment. In some examples, the private system boundary 142 may be associated with data access controls (e.g., user authentication, authorization, and/or encryption to restrict access to the private data), communication protocols (e.g., protocols that define how the system interacts with external entities), and/or security measures.

The private system boundary 142 may include the LLM 170, the vector database 106, and/or one or more other components of the private AI search platform 102 (e.g., an ingestion engine 116, a context retrieval engine 118, a prompt manager 114, embedding model 146, etc.). In some examples, instead of interfacing with a network-enabled LLM (e.g., a network-based service 138) stored on a remote server, the LLM 170 is stored on server computer(s) 160 within the private system boundary 142, which also includes the vector database 106 and/or other components of the private AI search platform 102.

The private AI search platform 102 (or a portion thereof) within the private system boundary 142 may be separated from one or more network-based services 138 (e.g., any network-based service 138) via a network firewall 140. A network firewall 140 may be a network security system that enforces a security policy at the network layer. In some examples, the network firewall 140 may monitor (e.g., inspect) incoming and outgoing data packets based on a set of rules and controls to determine whether to allow, block, or otherwise manage the traffic flow between the private system boundary 142 and the network-based service(s) 138. The network-based services 138 may include third party network services. In some examples, the network-based services 138 may include AI services such as public LLMs or AI tools and functionalities that can be accessed over the Internet. In some examples, the private AI search platform 102 within the private system boundary 142 may operate without the use of the Internet. In some examples, the private AI search platform 102 within the private system boundary 142 may execute offline (e.g., not connected to the Internet). In some examples, the private AI search platform 102 within the private system boundary 142 is a closed or a private system.

An entity (e.g., a person, organization, company, etc.) may use the system 100 to store data in a database 104. In some examples, the database 104 is a vector database 106. The data includes private data, which may cover instances of private data 108*a*, private data 108*b*, and private data portion 108*c*. Private data 108*a* may refer to data (e.g., data to be ingested) that is received from one or more computing devices 152 and is not yet stored in the vector database 106. In some examples, the private data 108*a* includes unstructured data. Private data 108*b* may refer to data that has been vectorized and stored in the vector database 106. In some examples, the private data 108*b* is represented by vectors (e.g., high-dimensional vectors) and/or JSON data. Private data portion 108*c* may refer to a portion or a subset (e.g., one or more sentences, paragraphs, or documents) of the private data 108*b* that is responsive to a user query 126 (e.g., the results of a vector search on the vector database 106).

Private data (e.g., 108*a*, 108*b*, 108*c*) may include information associated with an entity, which may or may not be publicly available. The private data may include organizational documents, web documents, internal documents, or generally any type of information. The private data may include private documents, e.g., documents that are only accessible by authorized users of the vector database 106. The private data may include public documents, e.g., documents that are known or accessible by the general public. In some examples, instances of the term "private data" may be replaced with "organizational data." In some examples, the LLM 170 may be a predefined LLM that was configured (e.g., trained) using publicly available information. In some examples, the LLM 170 may not be initially configured (e.g., trained) to answer questions about information found in the vector database 106. However, the system 100 discussed herein enables the LLM 170 to formulate model responses 130 to queries (e.g., user queries 126) about content included in the vector database 106, which may not have been used to configure (e.g., train) the LLM 170.

A vector database 106 is a database configured to store and retrieve information represented as vectors. A vector may be a series of numerical values or a multi-dimensional array that represent characteristics or features of a piece of data. Unlike traditional databases that store data in tables with rows and columns, a vector database 106 stores data points as vectors (e.g., high-dimensional vectors). Each dimension may represent a specific feature or attribute of the data. For example, a text document might be represented as a vector where each element reflects the weight or importance of a specific word within the document. In some examples, the vector database 106 may function as a memory device (e.g., a long-term memory) and/or a semantic knowledge store for an LLM 170.

The private AI search platform 102 includes an ingestion engine 116 configured to receive documents from one or more computing devices 152 and store the documents in the vector database 106. The documents include private data 108*a*. A document may be an instance of digital data. The documents may cover a wide variety of information such as files, text documents, web documents, web pages, PDFs, files and/or records. The documents may be associated with a wide variety of file formats. The documents may also cover images and/or video files. In some examples, the documents that are stored at the vector database 106 may be referred to as private data 108*b*.

In some examples, the ingestion engine 116 may include one or more indexing engines (e.g., indexing nodes) configured to index the documents received via one or more computing devices 152. The ingestion engine 116 may include a distributed computing system with a plurality of nodes (e.g., which may also be referred to indexing nodes). The ingestion engine 116 may receive (e.g., ingest) data from one or more computing devices 152. The ingestion engine 116 may generate one or more index structures, including indexing vector(s) 110. An index structure (e.g., the indexing vector 110) may be a data structure that includes information about the documents that have been indexed. The index structure (e.g., the indexing vector 110) may be used by the context retrieval engine 118 to efficiently find semantically related content to the user query 126.

In some examples, the ingestion engine 116 may receive private data 108*a* (e.g., in a non-vector format and/or an unstructured format such as a textual format) from the computing device(s) 152, convert the private data 108*a* to private data 108*b* in a structured format (e.g., a vector format), and store the private data 108*b* in the structured format (e.g., the vector format) in the vector database 106. In some examples, the private data 108*b* in the vector format includes JavaScript Object Notation (JSON) data and vectors. In other words, the ingestion engine 116 may vectorize the incoming data (e.g., private data 108*a*), which includes converting textual data into numeric data (e.g., vectors) that represents the textual data. In some examples, the ingestion engine 116 receives data already in a vector format from the computing device(s) 152. In some examples, converting the private data 108*a* in a text format to the private data 108*b* in a vector format includes converting an object in memory to a byte stream that can be stored as a binary file on disk and vectoring the byte stream using an embedding model 146.

In some examples, the ingestion engine 116 may operate with an embedding model 146 configured to embed the textual data into vectors, thereby generating the private data 108*b*. In some examples, the embedding model 146 includes one or more neural networks. In some examples, the embedding model 146 includes a software library. In some examples, the context retrieval engine 118 and/or the prompt manager 114 may also use the embedding model 146 to transition between textual data and vectors. In some examples, the embedding model 146 is an embedding model that can also be used for text generation by the LLM 170. In some examples, the embedding model 146 is a LLM embedding model. In some examples, the embedding model 146 is a model that is distinct from an embedding model used by the LLM 170. The embedding model 146 may receive the private data 108*a* (e.g., unstructured data) as input and generate a numerical vector representation of the private data 108*a*. This vector may capture the essential meaning and relationships within the data. For example, an embedding model 146 may convert a sentence, a paragraph, or a document into a vector, where similar sentences are positioned closer together in the high-dimensional space. The embedding model 146 may encode semantic similarity between data points into the vector representation. This allows the vector database 106 to efficiently find similar data points based on their vector embeddings, even if the original data might be expressed differently (e.g., synonyms in a text search).

The private AI search platform 102 may receive a user query 126 via a chat interface 156 (e.g., an AI chat interface) and initiate retrieval of a private data portion 108*c*, that is responsive to the user query 126, from the vector database 106. For example, the private AI search platform 102 includes a context retrieval engine 118 configured to retrieve a private data portion 108*c* that satisfies the user query 126. In some examples, instances of the term "private data portion" may be replaced with "responsive data" or "retrieved content." The private data portion 108*c* may be a portion or a subset of the private data 108*b* that is stored at the vector database 106 that is responsive to the terms of the user query 126. The private data portion 108*c* may be one or more sentences, one or more paragraphs, or one or more documents that are semantically related to the user query 126. In some examples, in response to the user query 126, the context retrieval engine 118 may execute a vector search to find semantically similar data portions (e.g., sentences, paragraphs, or documents) in the vector database 106. In some examples, the context retrieval engine 118 may generate a query vector using the textual data of the user query 126 and identify data points with vector representations closest to the query vector.

The private AI search platform 102 includes a prompt manager 114 configured to generate a prompt 124 with the user query 126 and a context window 128. The context window 128 includes the private data portion 108*c* retrieved by the context retrieval engine 118. In some examples, the private data portion 108*c* included in the prompt 124 is in the vector format (e.g., numerical representation of the underlying data). In some examples, the user query 126 included in the prompt 124 is in the vector format (e.g., vector query). In some examples, the prompt manager 114 uses the embedding model 146 to convert the private data portion 108*c* in the vector format (e.g., retrieved from the vector database 106) to a text-based format. In other words, the prompt manager 114 may convert the responsive vector(s) to textual data and include the textual data in the prompt 124. In some examples, the user query 126 included in the prompt 124 is in a textual format. In some examples, the context window 128 includes one or more system prompts 113. A system prompt 113 may be pre-configured textual data that directs the LLM to generate responses.

The prompt manager 114 may communicate with the LLM 170 by providing the prompt 124 as an input to the LLM 170. In some examples, the prompt manager 114 may communicate with the LLM 170 via one or more application programming interfaces (APIs) 112. The LLM 170 uses the context window 128 for formulating a model response 130 with textual data 132 that answers the user query 126 from the private data portion 108*c* and the system prompt 113 included in the prompt 124. The textual data 132 may be generative artificial intelligence (AI) content.

The private AI search platform 102 may initiate display of the model response 130 on the chat interface 156. Initiating display of the model response 130 may include transmitting information to the computing device 152 that causes the computing device 152 to display the model response 130 in the chat interface 156. Initiating display of the model response 130 may include transmitting information to an application 166 (e.g., the chat application) that causes the application 166 to display the model response 130 in the chat interface 156.

In some examples, the context retrieval engine 118 may retrieve personalization data 122 about the user that submitted the user query from the vector database 106 or other database 104 (e.g., which can be a standard non-vector database), and the prompt manager 114 may include the personalization data 122 in the prompt 124 so that the LLM 170 can personalize the model response 130. The personalization data 122 may be obtained from a user profile stored in the database 104, where the user profile includes information about the user. The user and/or the user profile may be associated with a user identifier 145. A user identifier 145 may be a string of values that uniquely represent a user. The context retrieval engine 118 may obtain a user identifier 145 associated with a user that submitted the user query 126. In some examples, the context retrieval engine 118 obtains the user identifier 145 from the user query 126 received at the context retrieval engine 118. The context retrieval engine 118 retrieves the personalization data 122 from the database 104 using the user identifier 145, where the personalization data 122 includes information about the user. In some examples, the prompt manager 114 may include the personalization data 122 in the prompt 124.

In some examples, the personalization data 122 may include the location of the user, organization group(s) associated with the user, and/or an organization role of the user. For example, in response to the query "how does compensation work", the model response 130 may depend on whether the user is a manager, a non-managing engineer, or other organization role or group associated with the user. In some examples, the personalization data 122 may include document access control data about one or more access permissions (or restrictions) associated with a user for accessing the private data 108b in the vector database 106. In some examples, the context retrieval engine 118 may retrieve private data portion 108c from the vector database 106 in which the user has access rights to. A document, a group of documents, or a database (or dataset) may include a document security setting, and the context retrieval engine 118 may retrieve private data portion 108c, from the vector database 106, responsive to the user query 126 that satisfies the document security setting. For example, a manager may be allowed to access documents that are not accessible by non-managers. As such, model responses 130 generated by the LLM 170 may use documents with access rights that correspond to the user that submitted the user query 126.

An example of the user query 126 may be "how do I report unemployment benefits identity fraud in the District of Columbia." If this query is submitted to a conventional cloud based LLM, the response may be too generic or not accurate because the training data is older and/or the LLM was trained with publicly available training information that is misleading, deficient, or not available. A user can search the DC government's webpage using keywords, but the user would have to read through the various search results to try and find the right answer. However, if that DC government branch used the private AI search platform 102 on their servers and stored their organization data (which may include internal docs about how to report unemployment benefits identity fraud) in the vector database 106, the context retrieval engine 118 may retrieve private knowledge from the vector database 106 about the unemployment benefits identity fraud, and the prompt manager 114 may insert that private knowledge into a prompt 124 that is used as context for generating an answer that responds to the user query 126 may be "how do I report unemployment benefits identity fraud in the District of Columbia." Since the LLM 170 is a self-hosted LLM on the servers within the private system boundary 142, the privacy and security of the private data is maintained.

Figure 1C:
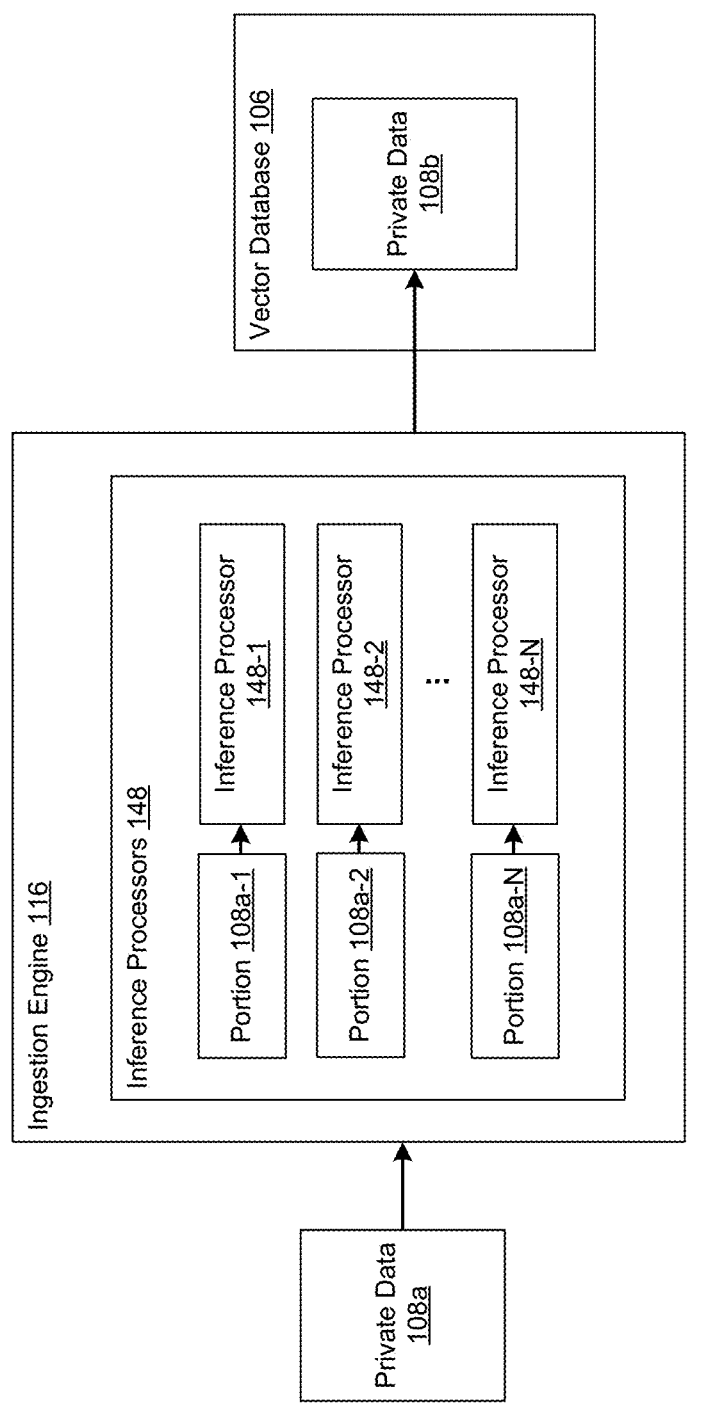
FIG. 1C illustrates an example of parallel processing of private data for storage in a vector database according to an aspect.

In some examples, as shown in FIG. 1C, the ingestion engine 116 may be configured to execute parallel processing to vectorize the private data 108a, which can decrease the time required to vectorize and store data in the vector database 106. The ingestion engine 116 may include a plurality of inference processors 148, where each inference processor 148 is configured to convert a portion of the ingested data to a vector format in parallel (e.g., at least partially in parallel) with other inference processors 148. In some examples, the inference processors 148 include machine-learning (ML) processing nodes. In some examples, the inference processors 148 include dynamically scalable ML nodes. In some examples, the inference processors 148 include or are associated with the embedding model 146 and are configured to embed private data (e.g., paragraphs of text) in a distribution manner. The ingestion engine 116 may initiate multiple inference processors 148 to convert the private data 108a in the non-vector format (e.g., textual data) to the private data 108a in the vector format.

The inference processors 148 may include an inference processor 148-1, and an inference processor 148-2 through inference processor 148-N, where N may be any integer greater or equal to two. Each inference processor 148 may receive a separate portion of the private data 108a to be vectorized and perform the vectorization at least partially in parallel. The inference processor 148-1 may receive a portion 108a-1 of the private data 108a, the inference processor 148-2 may receive a portion 108a-2 of the private data 108a, and the inference processor 148-N may receive a portion 108a-N of the private data. The portion 108a-1, the portion 108a-2, and the portion 108a-N may be separate portions of the private data 108a. The inference processor 148-1 may convert the portion 108a-1 from a textual format to a vector format, the inference processor 148-2 may convert the portion 108a-2 from a textual format to a vector format, and inference processor 148-N may convert the portion 108a-N from a textual format to a vector format. The inference processor 148-1 and the inference processor 148-2 to inference processor 148-N may execute at least partially in parallel with each other.

In some examples, the ingestion engine 116 may increase (e.g., scale up) or decrease (e.g., scale down) the number of inference processors 148, which may depend on the size of the private data 108a to be stored in the vector database 106. In some examples, the ingestion engine 116 may detect a size of the private data 108a and determine a number of inference processors 148 based on the size of the private data 108a. For example, if the size of the private data 108a is equal to or greater than a first threshold, the ingestion engine 116 may determine the number of inference processors 148 as two. If the size of the private data 108a is equal to or greater than a second threshold, the ingestion engine 116 may determine the number of inference processors 148 as three. If the size of the private data 108a is equal to or greater than a third threshold, the ingestion engine 116 may determine the number of inference processors 148 as four and so forth. The ingestion engine 116 may initiate the determined number of inference processors 148. The ingestion engine 116 may divide the private data 108a into the appropriate number of portions and provide each portion to their respective inference processor 148.

Figure 1D:
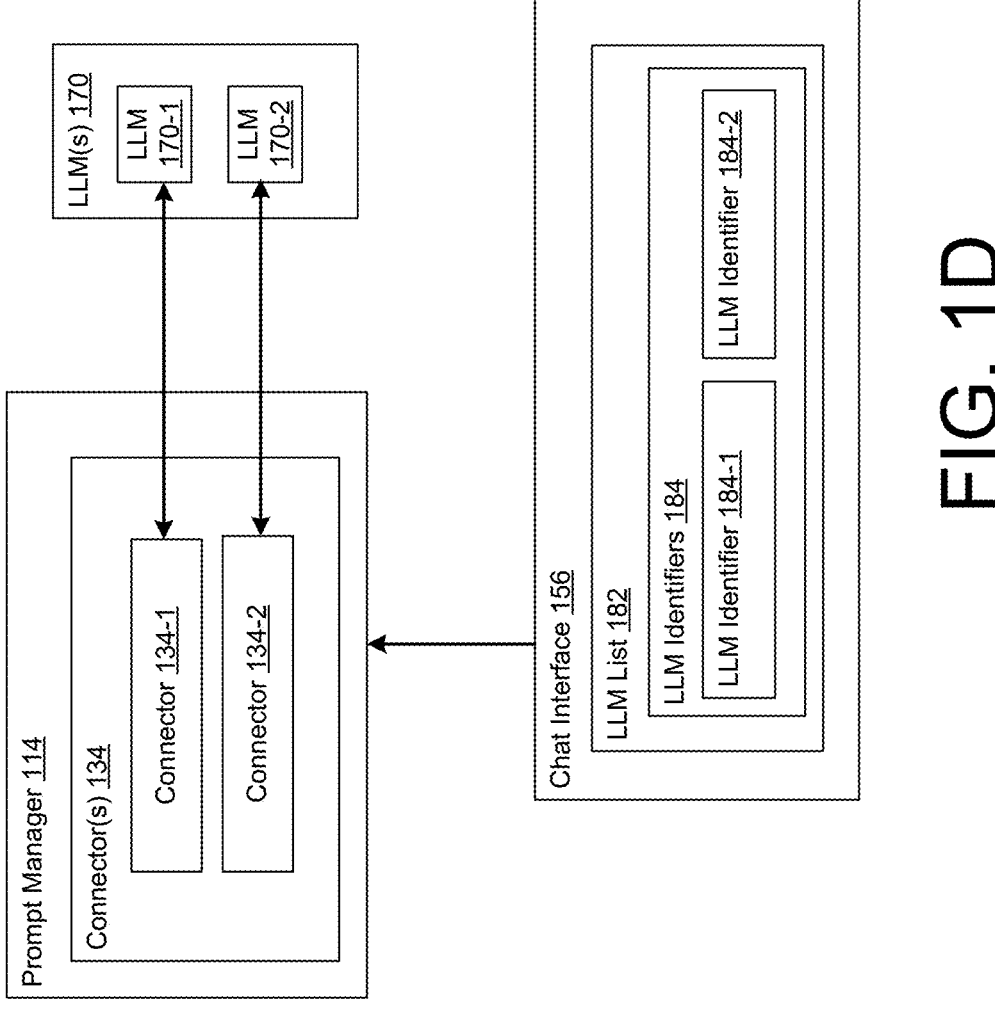
FIG. 1D illustrates an example of integrating multiple large language models for use in a system for retrieval augmented generating using private data according to an aspect.

In some examples, as shown in FIG. 1D, the prompt manager 114 may communicate with one or more LLMs 170, including an LLM 170-1 and an LLM 170-2. Although two LLMs 170 are depicted in FIG. 1D, the prompt manager 114 may be configured to communicate with any number of LLMs 170, including three, four, five, or more than five. For example, instead of integrating a single LLM 170 in the private AI search platform 102, the private AI search platform 102 may be configured to operate with a plurality of different LLMs 170, e.g., different self-hosted LLMs stored within the private system boundary 142. In some examples, the prompt manager 114 includes one or more connectors 134, where each connector 134 corresponds to a different LLM 170. A connector 134 may be a computer object that is stored at the private AI search platform 102 and includes information that enables a prompt manager 114 to communicate with a corresponding LLM 170. In some examples, the prompt manager 114 includes an abstraction library 136. The abstraction library 136 may define a library that generates a prompt 124 with a generic format that may be used by any of the LLMs 170 with connectors 134 stored at the private AI search platform 102. The use of the connectors 134 and/or the abstraction library 136 may enable the private AI search platform 102 to be agnostic to a plurality of LLMs 170. The techniques discussed herein provide the user freedom to use a variety of different LLMs 170, as well as the ability to pivot between multiple LLMs 170 at any point in time, which may provide improvements in cost control, speed, and/or privacy.

In some examples, the LLM 170 that is used to generate the model response 130 may be selected by the user. For example, as shown in FIG. 1D, the chat interface 156 may provide an LLM list 182 with LLM identifiers 184 that identify the LLMs 170 that can be used for the private AI search platform 102. The LLM list 182 may include an LLM identifier 184-1 associated with the LLM 170-1, and an LLM identifier 184-2 associated with the LLM 170-2. Each LLM identifier 184 that is included in the LLM list 182 has a corresponding connector 134 that is used by a prompt manager 114 to communicate with a respective LLM 170. A connector 134-1 is associated with the LLM 170-1, and a connector 134-2 is associated with the LLM 170-2. In response to selection of the LLM identifier 184-1, the prompt manager 114 may use the connector 134-1 to transmit a prompt 124 to the LLM 170-1 and receive a model response 130 from the LLM 170-1. In response to selection of the LLM identifier 184-2, the prompt manager 114 may use the connector 134-2 to transmit a prompt 124 to the LLM 170-2 and receive a model response 130 from the LLM 170-2.

The private AI search platform 102 may include one or more structures, techniques, or mechanisms that reduce the amount of tokens used in the context window 128, which can further reduce the computational cost of processing LLM queries (e.g., prompts) by an LLM 170. In some examples, the context retrieval engine 118 may retrieve, in response to a user query 126, private data 108b according to one or more search strategies. Using the search strategies discussed herein, the responsive private data (e.g., private data portion 108c) from the vector database 106 may be highly relevant to the user query 126, where a lesser amount of private data can be included in the prompt 124, thereby reducing the token size of the prompt 124 (thereby reducing the computational cost of processing an LLM query). The search strategies may include a vector database search, a natural language processing (NLP) enrichment search, a late interaction model search, and/or a regular token matching search. In some examples, the search engine uses a hybrid search that uses a combination of two or more of the above search strategies.

The computing device 152 may be any type of computing device that includes one or more processors 101, one or more memory devices 103, a display 154, and an operating system 105 configured to execute (or assist with executing) one or more applications 166, one of which may be a chat application configured to communicate with the private AI search platform 102. In some examples, the chat application is a native application installable on the operating system 105. In some examples, the chat application is a web application executable by a browser application (e.g., one of the applications 166). In some examples, the chat application is a web page executable by a browser application. In some examples, the chat interface 156 is an interface of the chat application. In some examples, the computing device 152 is a laptop computer. In some examples, the computing device 152 is a desktop computer. In some examples, the computing device 152 is a tablet computer. In some examples, the computing device 152 is a smartphone. In some examples, the computing device 152 is a wearable device (e.g., a head-mounted display device such as an augmented reality (AR) or a virtual reality (VR) device).

A browser application is a web browser configured to access information on the Internet. The browser application may launch one or more browser tabs in the context of one or more browser windows on a display 154 of the computing device 152. A browser tab may display content (e.g., web content) associated with a web document (e.g., webpage, PDF, images, videos, etc.) and/or an application such as a web application, progressive web application (PWA), and/or extension. A web application may be an application program that is stored on a remote server (e.g., server computer 160) and delivered over the network through the browser application (e.g., a browser tab). In some examples, the chat interface 156 is not an interface of a browser application.

The operating system 105 is a system software that manages computer hardware, software resources and provides common services for the applications 166. In some examples, the operating system 105 is an operating system designed for a larger display 154 such as a laptop or desktop (e.g., sometimes referred to as a desktop operating system). In some examples, the operating system 105 is an operating system for a smaller display 154 such as a tablet or a smartphone (e.g., sometimes referred to as a mobile operating system). In some examples, the chat application is executable by the operating system 105. The chat application may receive the user query 126 via the input field 165 of the chat interface 156, and the chat application may transmit the user query 126 to the private AI search platform 102.

The processor(s) 101 may be formed in a substrate configured to execute one or more machine executable instructions or pieces of software, firmware, or a combination thereof. The processor(s) 101 can be semiconductor-based—that is, the processors can include semiconductor material that can perform digital logic. The memory device(s) 103 may include a main memory that stores information in a format that can be read and/or executed by the processor(s) 101. The memory device(s) 103 may store the operating system 105, including the chat application that, when executed by the processors 101, performs certain operations discussed with reference to the chat application discussed herein. In some examples, the memory device(s) store one or more portions of the private AI search platform 102 that, when executed by the processors 101, performs certain operations discussed with reference to the private AI search platform 102. In some examples, the memory device (s) 103 includes a non-transitory computer-readable medium that includes executable instructions that cause at least one processor (e.g., the processors 101) to execute the operations discussed herein.

The server computer 160 may be computing devices that take the form of a number of different devices, for example a standard server, a group of such servers, or a rack server system. The server computer 160 may represent a single server computer or multiple server computer. In some examples, the server computer 160 may represent multiple server computers that are in communication with each other. In some examples, the server computer 160 may be a single system sharing components such as processors and memories. In some examples, the server computer 160 may be multiple systems that do not share processors and memories. The network may include the Internet and/or other types of data networks, such as a local area network (LAN), a wide area network (WAN), a cellular network, satellite network, or other types of data networks. The network may also include any number of computing devices (e.g., computers, servers, routers, network switches, etc.) that are configured to receive and/or transmit data within the network. The network may further include any number of hardwired and/or wireless connections.

The server computer(s) 160 may include one or more processors 161 formed in a substrate, an operating system (not shown) and one or more memory devices 163. The memory device(s) 163 may represent any kind of (or multiple kinds of) memory (e.g., RAM, flash, cache, disk, tape, etc.). In some examples (not shown), the memory devices may include external storage, e.g., memory physically remote from but accessible by the server computer(s) 160. The processor(s) 161 may be formed in a substrate configured to execute one or more machine executable instructions or pieces of software, firmware, or a combination thereof. The processor(s) 161 can be semiconductor-based—that is, the processors can include semiconductor material that can perform digital logic. The memory device(s) 163 may store information in a format that can be read and/or executed by the processor(s) 161. The memory device(s) 163 may store one or more portions of the private AI search platform 102, that, when executed by the processor(s) 161, perform certain operations discussed herein. In some examples, the memory device(s) 163 includes a non-transitory computer-readable medium that includes executable instructions that cause at least one processor (e.g., the processor(s) 161) to execute operations.

The LLM 170 may include any type of pre-trained LLM configured to generate a model response 130 in response to a prompt 124. In some examples, the LLM 170 is stored on a server computer 160 that hosts the private AI search platform 102. In some examples, the LLM 170 is a pre-defined LLM that is managed or owned by the private AI search platform 102.

The LLM 170 includes weights. The weights are numerical parameters that the LLM 170 learns during the training process. The weights are used to compute the output (e.g., the model response 130) of the LLM 170. The LLM 170 may receive the prompt 124 from the prompt manager 114. The LLM 170 includes a pre-processing engine configured to pre-process the information in the prompt 124. Pre-processing may include converting the textual input of the prompt 124 to individual tokens (e.g., words, phrases, or characters). Pre-processing may include other operations such as removing stop words (e.g., "the", "and", "of") or other terms or syntax that do not impart any meaning to the LLM 170. The LLM 170 includes an embedding engine configured to generate word embeddings from the pre-processed text input. The word embeddings may be vector representations that assist the LLM 170 to capture the semantic meaning of the input tokens and may assist the LLM 170 to better understand the relationships between the input tokens. In some examples, the pre-processing and the embedding engine are implemented by the embedding model 146 on the private AI search platform 102. The embedding model 146 may be used by the ingestion engine 116, the context retrieval engine 118, and/or the prompt manager 114.

The LLM 170 includes neural network(s) configured to receive the word embeddings and generate an output. A neural network includes multiple layers of interconnected neurons (e.g., nodes). The neural network may include an input layer, one or more hidden layers, and an output later. The output may include a sequence of output word probability distributions, where each output distribution represents the probability of the next word in the sequence given the input sequence so far. In some examples, the output may be represented as a probability distribution over the vocabulary or a subset of the vocabulary. The neural network(s) is configured to receive the word embeddings and generate an output, and, in some examples, the query activity (e.g., previous natural language queries and textual responses). The output may represent a version of the model response 130. The output may include a sequence of output word probability distributions, where each output distribution represents the probability of the next word in the sequence given the input sequence so far. In some examples, the output may be represented as a probability distribution over the vocabulary or a subset of the vocabulary. A decoder is configured to receive the output and generate the model response 130. In some examples, the decoder may select the most likely instruction, sampling from a probability distribution, or using other techniques to generate coherent and well written model response 130. In some examples, the decoder is implemented by the embedding model 146 at the private AI search platform 102.

FIG. 2 is a flowchart 200 depicting example operations of a system for enabling the generation of model responses using private data stored in a database (e.g., a vector database). The operations may provide a private AI search platform that enables an LLM to use data (e.g., private data) to generate a model response that responds to a user query that maintains the privacy of the data. For example, the AI search platform may execute a semantic search to retrieve a private data portion (e.g., private knowledge) from a vector database and then inject that context in a prompt that also includes the user query. The private AI search platform includes a private LLM (e.g., a self-hosted LLM) configured to receive the prompt and generate a model response that responds to the user query based on the private data portion. The AI search platform may enable retrieval augmented generation (RAG) using private data in a secure manner that can reduce the risk of cybersecurity breaches. In some examples, the AI search platform may reduce amount of the computing resources (e.g., central processing unit (CPU) power, memory requirements, etc.) for generating such responses, increase the speed of generating LLM responses using private data, and/or provide a high level of security and privacy for protecting private data that is used by an LLM.

The example operations of FIG. 2 may be executed by the system 100 of FIGS. 1A to 1D. The flowchart 200 may depict operations of a computer-implemented method. Although the flowchart 200 of FIG. 2 illustrates the operations in sequential order, it will be appreciated that this is merely an example, and that additional or alternative operations may be included. Further, operations of FIG. 2 and related operations may be executed in a different order than that shown, or in a parallel or overlapping fashion.

Operation 202 includes receiving, via an input field on a chat interface of a computing device, a user query. Operation 204 includes retrieving, from a vector database, a private data portion that is responsive to the user query. Operation 206 includes transmitting a prompt to a large language model, the prompt including the user query and the private data portion. Operation 208 includes receiving, from the large language model, a model response with textual data that responds to the user query, the textual data being generated by the large language model using the private data portion. Operation 210 includes initiating display of the model response in the chat interface.

Clause 1. A method comprising: receiving, via an input field on a chat interface of a computing device, a user query; retrieving, from a vector database, a private data portion that is responsive to the user query; transmitting a prompt to a large language model, the prompt including the user query and the private data portion; receiving, from the large language model, a model response with textual data that responds to the user query, the textual data being generated by the large language model using the private data portion; and initiating display of the model response in the chat interface.

Clause 2. The method of clause 1, further comprising: generating a private system boundary by storing the large language model and the vector database on one or more server computers associated with an entity, wherein a network firewall exists between the private system boundary and a network-based service.

Clause 3. The method of clause 1, wherein the computing device is a first computing device, the method further comprising: receiving private data, including the private data portion, from a second computing device; converting the private data from a non-vector format to a vector format; and storing the private data in the vector format in the vector database.

Clause 4. The method of clause 3, wherein converting the private data from the non-vector format to the vector format includes: initiating a plurality of inference processors to convert the private data from the non-vector format to the vector format, the plurality of inference processors including a first inference processor and a second inference processor; converting, by the first inference processor, a first portion of the private data; and converting, by the second inference processor, a second portion of the private data at least partially in parallel with the first inference processor.

Clause 5. The method of clause 4, further comprising: detecting a size of the private data; determining a number of the plurality of inference processors based on the size of the private data; and initiating the number of the plurality of inference processors.

Clause 6. The method of clause 1, wherein the large language model is a first large language model, the method further comprising: obtaining a first connector from a plurality of connectors, the plurality of connectors including the first connector and a second connector, the first connector being associated with the first large language model, the second connector being associated with a second large language model; and transmitting, using the first connector, the prompt to the first large language model.

Clause 7. The method of clause 6, wherein the prompt is a first prompt, the method further comprising: receiving, via the chat interface, a selection of the second large language model; obtaining the second connector from the plurality of connectors; and transmitting, using the second connector, a second prompt to the second large language model.

Clause 8. The method of clause 6, further comprising: obtaining a user identifier associated with a user that submitted the user query; and retrieving, from the vector database, personalization data having information about the user, the prompt also including the personalization data.

Clause 9. An apparatus comprising: at least one processor; and a non-transitory computer-readable medium storing executable instructions that cause the at least one processor to execute operations, the operations comprising: receiving, via an input field on a chat interface of a computing device, a user query; retrieving, from a vector database, a private data portion that is responsive to the user query; transmitting a prompt to a large language model, the prompt including the user query and the private data portion; receiving, from the large language model, a model response with textual data that responds to the user query, the textual data being generated by the large language model using the private data portion; and initiating display of the model response in the chat interface.

Clause 10. The apparatus of clause 9, wherein the operations further comprise: generating a private system boundary by storing the large language model and the vector database on one or more server computers associated with an entity, wherein a network firewall exists between the private system boundary and a network-based service.

Clause 11. The apparatus of clause 9, wherein the operations further comprise: receiving private data, including the private data portion, from a second computing device; converting the private data from a non-vector format to a vector format; and storing the private data in the vector format in the vector database.

Clause 12. The apparatus of clause 11, wherein the operations further comprise: initiating a plurality of inference processors to convert the private data from the non-vector format to the vector format, the plurality of inference processors including a first inference processor and a second inference processor; converting, by the first inference processor, a first portion of the private data; and converting, by the second inference processor, a second portion of the private data at least partially in parallel with the first inference processor.

Clause 13. The apparatus of clause 12, wherein the operations further comprise: detecting a size of the private data; determining a number of the plurality of inference processors based on the size of the private data; and initiating the number of the plurality of inference processors.

Clause 14. The apparatus of clause 9, wherein the large language model is a first large language model, wherein the operations further comprise: obtaining a first connector from a plurality of connectors, the plurality of connectors including the first connector and a second connector, the first connector being associated with the first large language model, the second connector being associated with a second large language model; and transmitting, using the first connector, the prompt to the first large language model.

Clause 15. The apparatus of clause 14, wherein the prompt is a first prompt, wherein the operations further comprise: receiving, via the chat interface, a selection of the second large language model; obtaining the second connector from the plurality of connectors; and transmitting, using the second connector, a second prompt to the second large language model.

Clause 16. A non-transitory computer-readable medium storing executable instructions that when executed by at least one processor cause the at least one processor to execute operations, the operations comprising: receiving, via an input field on a chat interface of a computing device, a user query; retrieving, from a vector database, a private data portion that is responsive to the user query; transmitting a prompt to a large language model, the prompt including the user query and the private data portion; receiving, from the large language model, a model response with textual data that responds to the user query, the textual data being generated by the large language model using the private data portion; and initiating display of the model response in the chat interface.

Clause 17. The non-transitory computer-readable medium of clause 16, wherein the operations further comprise: generating a private system boundary by storing the large language model and the vector database on one or more server computers associated with an entity, wherein a network firewall exists between the private system boundary and a network-based service.

Clause 18. The non-transitory computer-readable medium of clause 17, wherein the operations further comprise: receiving private data, including the private data portion, from a second computing device; converting the private data from a non-vector format to a vector format; and storing the private data in the vector format in the vector database.

Clause 19. The non-transitory computer-readable medium of clause 18, wherein the operations further comprise: initiating a plurality of inference processors to convert the private data from the non-vector format to the vector format, the plurality of inference processors including a first inference processor and a second inference processor; converting, by the first inference processor, a first portion of the private data; and converting, by the second inference processor, a second portion of the private data at least partially in parallel with the first inference processor.

Clause 20. The non-transitory computer-readable medium of clause 19, wherein the operations further comprise: detecting a size of the private data; determining a number of the plurality of inference processors based on the size of the private data; and initiating the number of the plurality of inference processors.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are remote from each other and typically interact through a communication network. The relationship of client and server arises by virtue of computer programs running on the respective computers and having a client-server relationship with each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
   receiving organizational data from a first computing device;
   converting, by an embedding model, the organizational data from a non-vector format to a vector format, including:
      activating a number of a plurality of inference processors based on a detected size of the organizational data;
      partitioning the organizational data into a plurality of portions; and
      converting, by the plurality of inference processors, the plurality of portions to the vector format such that the plurality of portions are converted at least partially in parallel with each other;
   storing the organizational data in the vector format in a vector database;
   receiving, via an input field on a chat interface of a second computing device, a user query;
   converting, by the embedding model, the user query to a vectorized user query;
   retrieving, from the vector database, an organizational data portion, from the organizational data, that is responsive to the vectorized user query;
   transmitting a prompt to a language model, the prompt including the user query and the organizational data portion retrieved from the vector database;
   receiving, from the language model, a model response with textual data that responds to the user query; and
   initiating display of the model response in the chat interface,
   wherein the embedding model and the language model are stored on at least one server computer within a private system boundary separated from network-based services such that the organizational data and the organizational data portion are not transmitted outside the private system boundary when generating the model response.

2. The method of claim 1, wherein the language model is a first language model, the method further comprising:
   rendering a list of language models for selection by a user;
   receiving a user selection of the first language model from the list of language models;
   in response to the user selection of the first language model, obtaining, from a memory device, a first connector of a plurality of connectors, the plurality of connectors including the first connector and a second connector, the first connector configured to enable communication with the first language model, the second connector configured to enable communication with a second language model; and
   transmitting, using the first connector, the prompt to the first language model.

3. The method of claim 2, wherein the prompt is a first prompt, the method further comprising:
   receiving a user selection of the second language model from the list of language models;
   in response to the user selection of the second language model, obtaining, from the memory device, the second connector of the plurality of connectors; and
   transmitting, using the second connector, a second prompt to the second language model.

4. The method of claim 1, further comprising:
   obtaining a user identifier associated with a user that submitted the user query;
   retrieving, from the vector database, personalization data based on the user identifier, the personalization data including document access control data about at least one access permission or restriction associated with the user for accessing the organizational data; and
   retrieving, from the vector database, one or more organizational data portions that satisfy the document access control data.

5. The method of claim 1, wherein converting the organizational data from the non-vector format to the vector format includes converting an object in memory to a byte stream that can be stored as a binary file on disk and vectoring the byte stream using the embedding model.

6. An apparatus comprising:
   at least one processor; and
   a non-transitory computer-readable medium storing executable instructions that cause the at least one processor to execute operations, the operations comprising:
      receiving organizational data from a first computing device;
      converting, by an embedding model, the organizational data from a non-vector format to a vector format, including:
         activating a number of a plurality of inference processors based on a detected size of the organizational data;
         partitioning the organizational data into a plurality of portions; and
         converting, by the plurality of inference processors, the plurality of portions to the vector format such that the plurality of portions are converted at least partially in parallel with each other;
      storing the organizational data in the vector format in a vector database;
      receiving, via an input field on a chat interface of a second computing device, a user query;
      converting, by the embedding model, the user query to a vectorized user query;
      retrieving, from the vector database, an organizational data portion, from the organizational data, that is responsive to the vectorized user query;
      transmitting a prompt to a language model, the prompt including the user query and the organizational data portion retrieved from the vector database;
      receiving, from the language model, a model response with textual data that responds to the user query; and
   initiating display of the model response in the chat interface,
      wherein the embedding model and the language model are stored on at least one server computer within a private system boundary separated from network-based services, such that the organizational data and the organizational data portion are not transmitted outside the private system boundary when generating the model response.

7. The apparatus of claim 6, wherein the language model is a first language model, wherein the operations further comprise:

rendering a list of language models for selection by a user;

receiving a user selection of the first language model from the list of language models;

in response to the user selection of the first language model, obtaining, from a memory device, a first connector of a plurality of connectors, the plurality of connectors including the first connector and a second connector, the first connector configured to enable communication with the first language model, the second connector configured to enable communication with a second language model; and transmitting, using the first connector, the prompt to the first language model.

8. The apparatus of claim 7, wherein the prompt is a first prompt, wherein the operations further comprise:

receiving a user selection of the second language model from the list of language models;

in response to the user selection of the second language model, obtaining, from the memory device, the second connector of the plurality of connectors; and transmitting, using the second connector, a second prompt to the second language model.

9. The apparatus of claim 6, wherein the language model is a self- hosted model not publicly accessible.

10. The apparatus of claim 6, wherein the operations further comprise:

obtaining a user identifier associated with a user that submitted the user query;

retrieving, from the vector database, personalization data based on the user identifier, the personalization data including document access control data about at least one access permission or restriction associated with the user for accessing the organizational data; and retrieving, from the vector database, one or more organizational data portions that satisfy the document access control data.

11. A non-transitory computer-readable medium storing executable instructions that when executed by at least one processor cause the at least one processor to execute operations, the operations comprising:

receiving organizational data from a first computing device;

converting, by an embedding model, the organizational data from a non-vector format to a vector format, including:

activating a number of a plurality of inference processors based on a detected size of the organizational data;

partitioning the organizational data into a plurality of portions; and converting, by the plurality of inference processors, the plurality of portions to the vector format such that the plurality of portions are converted at least partially in parallel with each other;

storing the organizational data in the vector format in a vector database;

receiving, via an input field on a chat interface of a second computing device, a user query;

converting, by the embedding model, the user query to a vectorized user query;

retrieving, from the vector database, an organizational data portion, from the organizational data, that is responsive to the user query;

transmitting a prompt to a language model, the prompt including the user query and the organizational data portion;

receiving, from the language model, a model response with textual data that responds to the user query; and initiating display of the model response in the chat interface, wherein the embedding model and the language model are stored on at least one server computer within a private system boundary separated from network-based services, such that the organizational data and the organizational data portion are not transmitted outside the private system boundary when generating the model response.

12. The non-transitory computer-readable medium of claim 11, further comprising:

obtaining a user identifier associated with a user that submitted the user query;

retrieving, from the vector database, personalization data based on the user identifier, the personalization data including document access control data about at least one access permission or restriction associated with the user for accessing the organizational data; and retrieving, from the vector database, one or more organizational data portions that satisfy the document access control data.

* * * * *